Oct. 9, 1962  C. VAN DER LELY ET AL  3,057,626
VEHICULAR DEVICE FOR SPREADING STREWABLE MATERIAL OVER
A STRIP-LIKE AREA OF THE GROUND DURING
GROUND TRAVERSING MOVEMENT
Original Filed March 30, 1954  2 Sheets-Sheet 1
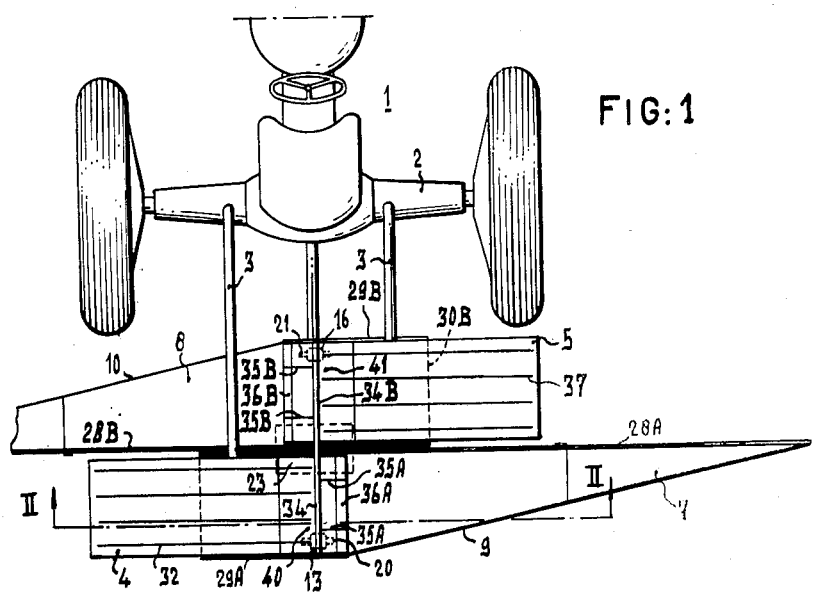
FIG:1
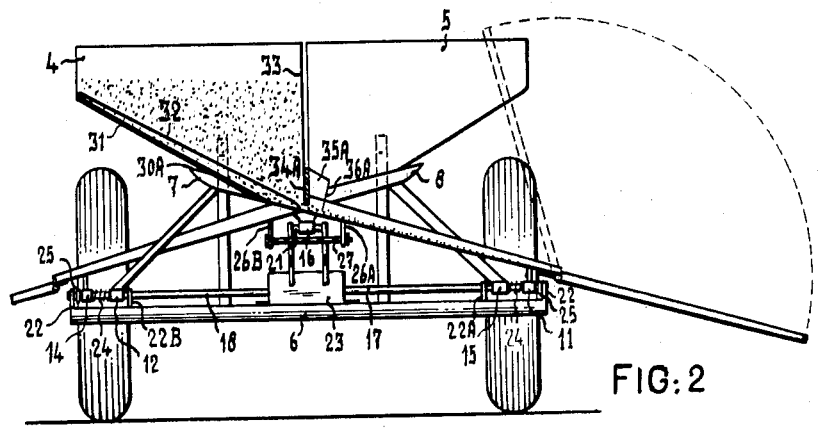
FIG:2

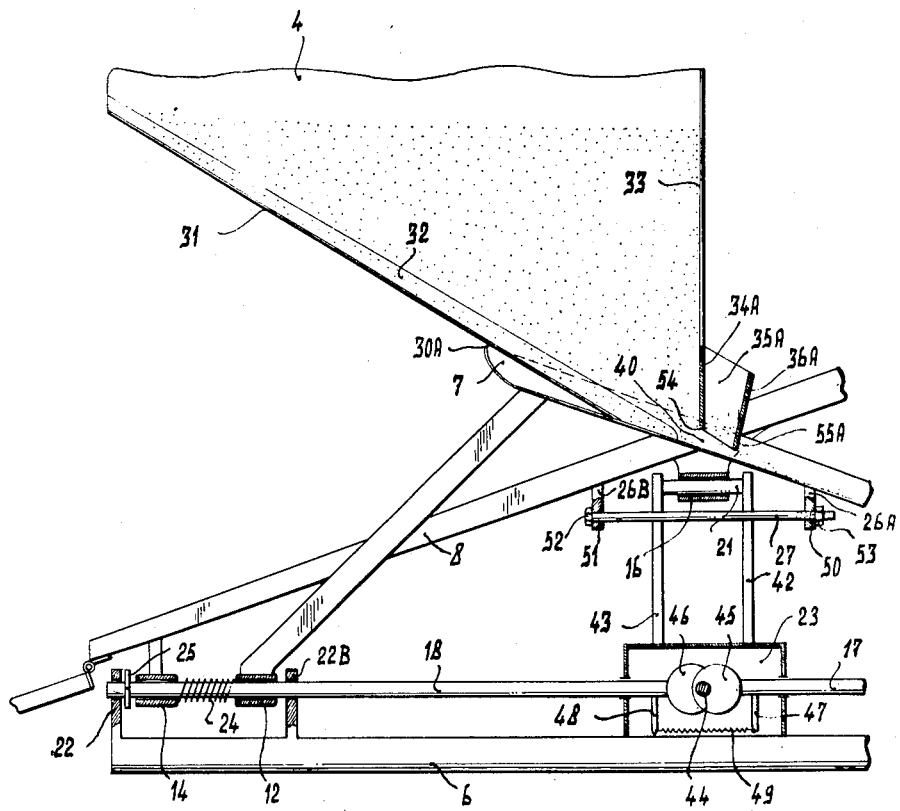

United States Patent Office 3,057,626
Patented Oct. 9, 1962

3,057,626
VEHICULAR DEVICE FOR SPREADING STREW-
ABLE MATERIAL OVER A STRIP-LIKE AREA OF
THE GROUND DURING GROUND TRAVERSING
MOVEMENT
Cornelis van der Lely, Zug, Switzerland, and Ary van der
Lely, Maasland, Netherlands, assignors to C. van der
Lely N.V., Maasland, Netherlands, a Dutch limited
company
Original application Mar. 30, 1954, Ser. No. 419,825, now
Patent No. 2,980,430, dated Apr. 18, 1961. Divided
and this application Mar. 30, 1960, Ser. No. 18,769
Claims priority, application Netherlands Apr. 2, 1953
8 Claims. (Cl. 275—7)

This invention relates to a vehicular device for spreading strewable material over a striplike area of the ground during ground traversing movement of the device; the device being of the type comprising a supporting frame at least one container for the material to be strewn mounted on said frame and having at least one outlet opening at least one spreading member mounted on said frame, and means coupled to said spreading member, whereby the latter is oscillated to spread the material supplied thereto through the outlet opening of the container over the striplike area. This application is a divisional application based on App. No. 419,825, filed March 30, 1954 and now Pat. No. 2,980,430.

It is an object of the present invention to provide a device of the above indicated kind which is of cheap and simple construction and which permits an even distribution of the material over a wide striplike area.

According to the invention this is attained by the fact that in the container an agitator is arranged which is coupled to the spreading member whereby said agitator is oscillated to cause a regular supply of material to pass through the outlet opening of the container.

Further objects, features and details of the invention will appear from the following description of a favorable embodiment with reference to the accompanying drawings, in which:

FIG. 1 shows a plan view of the distributor,

FIG. 2 is a sectional view along line II—II of FIG. 1, and

FIG. 3 shows elements of this distributor illustrated in the left hand parts of FIGS. 1 and 2 in greater detail.

The distributor according to the drawing is mounted upon a tractor 1 having a rear axle stay 2 which is provided with a supporting structure 3 carrying two containers 4 and 5, as well as a horizontal beam 6 located under said containers and arranged transversely to the direction of movement of the tractor.

With respect to a vertical plane passing through the beam 6, the containers 4 and 5 are respectively located behind and in front of said plane. Moreover the container 4 is located wholly to the left and the container 5 wholly to the right of the plane of symmetry of the tractor 1, said containers being provided in the proximity of said plane of symmetry with outlet openings 40 and 41. The openings 40 and 41 are covered on the lower side by spreading members 7 and 8 formed by inclined plates. Beneath each opening a part of the plates constitutes a part of the bottom of the container. The plates 7 and 8 extend transversely over a width which is considerably larger than the widths of the containers 4 and 5, whereby the material moves over the plates 7 and 8 in a direction tansversely to the direction of travel of the tractor, and is spread over a wide striplike area of the ground by moving over the edges 9 and 10 of the spreading members 7 and 8. The spreading of the material by the members 9 and 10 is caused by an oscillating motion of the spreading members in a horibontal direction transversely to the direction of travel.

In order to enable the plate-shaped spreading members to perform said movements, each plate is provided at three places with a guiding bushing adapted to slide upon a horizontal rod. As shown, the plates 7 and 8 are respectively provided with guiding bushings 11, 12, 13 and 14, 15, and 16. The bushings 11 and 15 are slidable upon a rod 17, the bushings 14 and 12 are slidable upon a rod 18, whereas the bushings 13 and 16 are respectively slidable upon a rod 20 and 21. All said rods are supported by the beam 6, each of the rods 17 and 18 being slidably borne by two bearings 22A and 22B so that said rods can be moved to and fro by a vibrating mechanism 23, which will be described hereinafter, whereas the rods 20 and 21 are immovably connected to the beam 6 by means of uprights 42 and 43.

Between the bushings sliding on each of the rods 17 and 18 is provided a spring 24, said spring tending to move the plates 7 and 8 away from each other. The rods 17 and 18 are further provided with fixed abutments 25 co-operating with the bushings 11 and 14.

The mechanism 23 serves to move the rods 17 and 18 exactly in opposite oscillating motion with regard to each other. Said mechanism comprises a shaft 44 driven by the motor of the tractor 1 and carrying two oppositely arranged eccentric disks 45 and 46 bearing with their circumference against the inner ends of the rods 17 and 18. Each of said rods carries an arm 47 and 48, respectively, and between said arms a draw spring 49 is arranged. Thus, upon rotation of the shaft 44 the rods 17 and 18 will perform oscillating movements alternately towards and from each other. If these oscillating movements are effected, the plates 7 and 8 will perform corresponding oscillating movements due to the springs 24 and the abutments 25.

Against the lower face of each of the plates 7 and 8 is welded an extension 26A, 26B respectively provided with apertures 50 and 51. A bolt 27 passes through both of said apertures. The distance between the head 52 and the nut 53 of this bolt is somewhat smaller than the greatest distance which may occur between the remote sides of the extensions 26A and 26B during the reciprocating motion in the absence of a bolt.

Upon outward movement of the plates 7 and 8, the extensions 26A and 26B will strike sharply against the head 52 and the nut 53 of the bolt 27. In this manner a shockwise movement of the plates is caused without transmitting vibrations to the remaining parts of the device. A shockwise motion of the plates is necessary for some materials to be spread, though not for all of them. If materials are used which will inherently move over the plates at a sufficient speed, when the plates perform a continuous movement, the bolt is removed. For materials which can be displaced only with difficulty, a bumping or striking action should be effected when the speed of the plates is large; this may be obtained by reducing the distance between head 52 and nut 53 of the bolt 27. In this manner it is also possible to adjust the quantity of material strewn at each stroke. In order to be able to adjust this quantity of strewn material when the bolt 27 has been removed, the amplitude of the movement of the rods 17 and 18 may be made adjustable, e.g. by modifying the eccentricity of the eccentric disks 45 and 46.

The plates 7 and 8 are respectively provided with upstanding edges 28A, 29A, 30A, and 28B, 29B, 30B at the places where no material should leave the plate.

The container 4 is provided with a bottom 31 inclined in the same direction as the plate 7 but having a greater inclination than said plate, the lower edge of said bottom having only such a small distance to the plate as is necessary for moving the plate with the greatest admissible amplitude to prevent contact with the plate.

To the plate 7 are coupled four flat bars 32 extending into the container 4 and constituting an agitator which provides that the material is supplied regularly through the outlet opening 40 to the plate 7. This assures an even spreading of material until the container is wholly empty. Moreover the container has a vertical and rectangular wall surface 33 adjacent which a slide 34A is provided, of which the lower edge 54 is situated nearer to the plate 7 than that of the wall surface 33. On the slide 34A two vertical supporting surfaces 35A are fixed carrying a partition 36A with a horizontal lower edge 55A.

This lower edge 55A is nearer to the plate 7 than that of the slide 34A so that the layer of material moving over the plate under the slide 34A is not allowed to pass at the entire thickness; thus the partition 36A operates as a scraping or stripping wall. The thickness of the actually outflowing layer is thus defined by the height of the lower edge 55A of the partition 36A above the plate 7. This height may be adjusted by adjusting the slide 34A in height.

The container 5 is arranged in the same manner as the container 4, whereby to the spreading member 8 are fixed four flat bars 37 constituting an agitator for the material in the container 5. The slide 34B corresponding to the silde 34A is situated with the latter in a vertical plane and is integral therewith, by which the adjustment is greatly simplified and an equal strewing action of both plates 7 and 8 is assured. The slide 34B is hereby provided with a partition 36B carried by surfaces 35B fixed to the slide 34B.

What we claim is:

1. A vehicular device for spreading strewable material over a striplike area of the ground during ground traversing movement of the device; said device comprising a supporting frame, at least one container for the material to be strewn mounted on said frame and having at least one outlet opening; at least one spreading member mounted on said frame and located beneath the said container, means coupled to said spreading member whereby the latter is positively oscillated to spread material supplied thereto via the outlet opening of the container over the striplike area, said means causing said spreading member to oscillate in a horizontal direction substantially transverse to the travelling direction of the device, and agitating means extending in the container and coupled to the spreading member so that said agitating means is oscillated to cause a regular supply of material to pass through the outlet opening of the container, said agitating means extending along the wall of the said container and consisting of at least two arms spaced from each other along the container wall.

2. A vehicle including a mobile frame having a longitudinal axis, means for driving said frame, a container on said frame and generally disposed on one side of said axis, said container including a bottom wall sloping downwardly towards said axis, said container further including a vertical wall defining with the bottom wall a laterally facing discharge opening, a laterally extending plate beneath said discharge opening and extending therefrom, spaced arms on said plate and extending through the opening and along said bottom wall within the container to agitate material therein, bearings on said frame and aligned transversely of said axis, a rod extending slidably through said bearings and rigidly connected to said plate, and means on said frame driven by the first said means to displace said rod in said bearings and thereby displacing said plate and arms.

3. A vehicle including a mobile frame, a container on said frame, said container including a bottom wall sloping downwardly in a lateral direction and a vertical wall defining with the bottom wall a laterally facing discharge opening, a laterally extending plate beneath said discharge opening, spaced arms on said plate and extending through the opening and along said bottom wall within the container to agitate material therein, and means connected to said plate for displacing the same and said arms laterally of said frame.

4. A vehicle including a mobile frame having a longitudinal axis, means for driving said frame, first and second containers on said frame in leading and trailing relation with respect to said axis and generally on opposite sides of said axis, said containers each including a bottom wall sloping downwardly towards said axis, said containers further including a vertical wall defining with the associated bottom wall a laterally facing discharge opening, a laterally extending plate beneath each discharge opening and extending a substantial distance therefrom, spaced arms on each said plate and extending through the associated opening and along said bottom wall within the associated container to agitate material therein, a pivoted extension on each said plate, bearings on said frame and aligned transversely of said axis, rods extending slidably through said bearings and rigidly connected to said plates, eccentrics on said frame and driven by said means, said eccentrics displacing said rods in said bearings and thereby displacing said plates and arms, and means to limit the displacement of said plates and impart an impact shock thereto.

5. A vehicle as claimed in claim 4 comprising a slide operatively and adjustably disposed with respect to each discharge opening and including first and second edge portions spaced at different distances from the associated plate.

6. A vehicle as claimed in claim 4 comprising spring means connecting said rods and urging the same against said eccentrics.

7. A vehicle as claimed in claim 4 wherein each plate and associated bottom wall have different inclinations relative to the horizontal.

8. A vehicle as claimed in claim 4 wherein the plates respectively have leading and trailing edges constituting discharge edges, the discharge edges being inclined relative to said axis.

References Cited in the file of this patent

UNITED STATES PATENTS

| 112,583 | Gladding | Mar. 14, 1871 |
| 687,399 | Goodwin | Nov. 26, 1901 |
| 1,021,544 | Meronek | Mar. 26, 1912 |

FOREIGN PATENTS

| 409,876 | France | Feb. 28, 1910 |
| 12,968 | Australia | of 1933 |